Jan. 5, 1954
R. A. GUFFEY
2,665,128
TENSION RELIEF DEVICE FOR CABLES
Filed Dec. 21, 1951
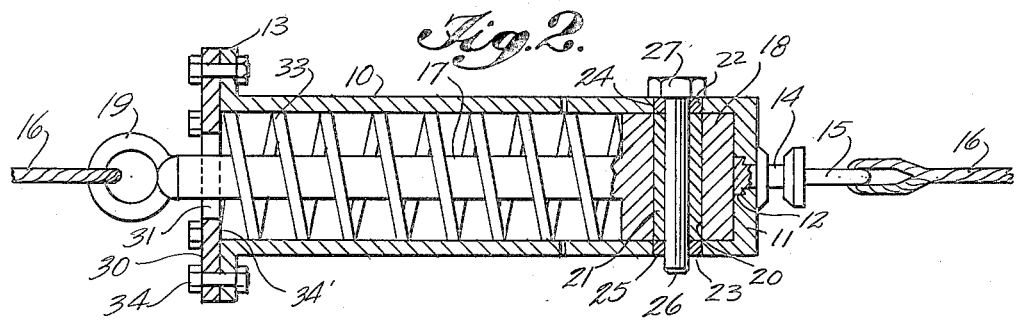
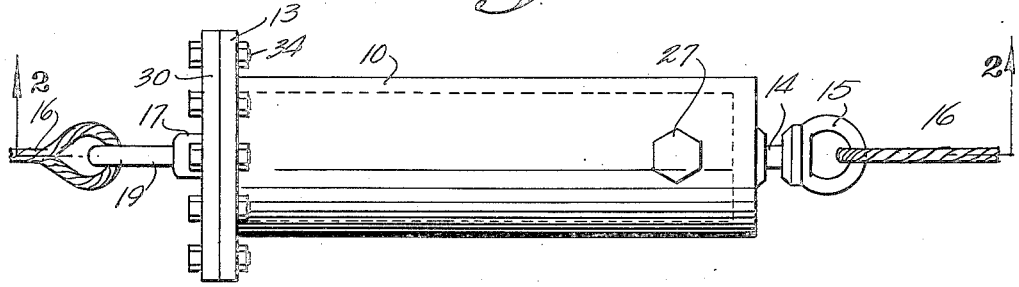
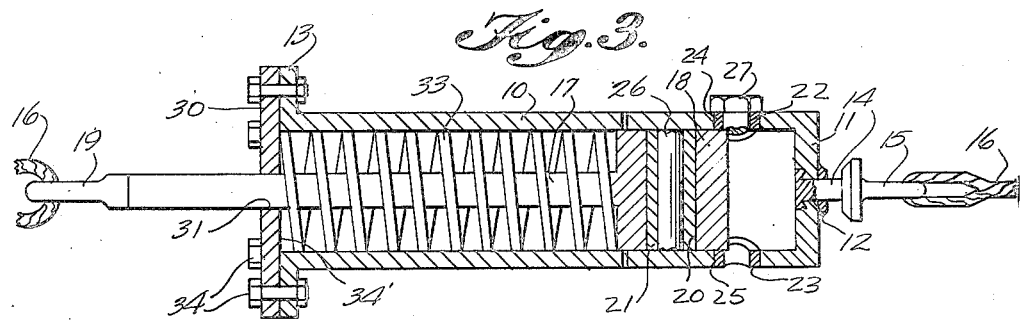
INVENTOR
*Ralph A. Guffey,*
BY
*McMorrow, Berman & Davidson*
ATTORNEYS Patented Jan. 5, 1954

2,665,128

UNITED STATES PATENT OFFICE 2,665,128

TENSION RELIEF DEVICE FOR CABLES

Ralph A. Guffey, Louisville, Ky.

Application December 21, 1951, Serial No. 262,693

3 Claims. (Cl. 267—71)

This device relates to tension relief devices for wire ropes or cables, and more particularly to a safety device adapted to be connected into a load-supporting cable to relieve the tension in the cable before the tension reaches a value sufficient to break the cable.

It is among the objects of the invention to provide a cable tension relief device which can be readily connected into a cable or wire rope in a manner such that it will be subjected to the tension in the associated cable; which includes a frangible element the breakage of which permits sufficient separation of the associated ends of the cable to relieve excessive tension and strain in the cable; which maintains the associated cable ends connected together and provides for resiliently resisted separation thereof; which provides a swivel connection between the associated cable ends to also relieve any excessive twisting of the cable; and which is simple and durable in construction, economical to manufacture, easy to install, and positive and effective in operation.

Other objects and advantages will become apparent from a consideration of the following description and the appended claims in conjunction with the accompanying drawing, wherein:

Figure 1 is a side elevational view of a cable tension relief device illustrative of the invention;

Figure 2 is a longitudinal cross-sectional view on the line 2—2 of Figure 1; and Figure 3 is a longitudinal cross-sectional view similar to Figure 2, but showing the parts in a different operative position from that illustrated in Figure 2.

With continued reference to the drawing, the device comprises an elongated tubular body 10, preferably of cylindrical shape and formed of a strong and substantially rigid material, such as steel. This body has one end closed by an end wall 11 which is disposed substantially perpendicular to the longitudinal center line of the body and provided with a central opening and is provided at its other end with an external annular flange 13 having angularly spaced apart apertures therein.

A shank 14 is secured at one end in the central aperture in the end wall 11 and projects outwardly of the end wall and a cable-attaching eye 15 is rotatably secured to the outer end of the shank 14 to provide a swivel connection. An associated cable 16 is secured at one end to the eye 15.

An elongated stem 17 extends from the interior of the body 10 out of the open end of the latter, and a head 18, preferably of cylindrical shape, is formed on the end of the stem 17 within the body 10 and has a close sliding fit in the body. A cable-attaching eye 19 is formed on the other end of the stem 17, and the cable 16 is also connected at one end to the eye 19.

The head 18 is provided with a bore 20 extending transversely or diametrically therethrough, and a tubular liner 21 is disposed in the bore 20 and extends from one end to the other of the bore. The tubular body 10 is provided near the end wall 11 with angularly spaced apart or diametrically opposed apertures 22 and 23 and washer-shaped liners 24 and 25 are disposed respectively in the apertures 22 and 23.

When the head 18 is adjacent to or against the inner side of the end wall 11 of the tubular body 10, the openings in the washers 24 and 25 register with the ends of the bore of the tubular liner 21 carried by the head 18, and a frangible pin 26 is inserted through the liner 21 and through the washers 24 and 25 to hold the head 18 adjacent the end wall 11 of the tubular body until the pin is subjected to a predetermined shearing force, which force is slightly less than that necessary to cause a cable breaking tension in the cable 16.

The pin 26 preferably has a head 27 on one end thereof and may be provided at its other end with suitable means for retaining it in operative position in the body 10 and the head 18, as, for example, having an opening extending diametrically therethrough and receiving a cotter key.

A plate 30, preferably of circular shape and having a diameter equal to the diameter of the flange end of the tubular body 10, is disposed against the outer side of the flange 13 and provided with angularly spaced apart apertures which register with the apertures in the flange and with a central aperture 31 through which the stem 17 extends.

The central aperture 31 in the plate 30 is provided with diametrically opposed extensions through which the ring-shaped eye 19 can be passed when the device is assembled and the portion of the plate 30 surrounding the aperture 31 and disposed within the adjacent end of the tubular body 10 provides an annular spring abutment.

A coil compression spring 33 surrounds the stem 17 between the head 18 and the annular spring abutment 34, and, if the shear pin 26 is broken by excessive tensional strain on the cable 16, resiliently resists separation of the associated ends of the cable to avoid any sudden jerk or snap of the cable incident to breaking of the shear pin.

The plate 30 is secured to the flange 13 by suitable means, such as the bolts 34 extending through registering apertures in the flange and the plate, although other means may be provided for securing a spring abutment to the corresponding end of the tubular body 10 without in any way exceeding the scope of the invention.

While the tension relief device has many uses, it is particularly useful in the cables which are used to tie barges together, so that two or more barges can be easily handled by a single tug boat. Such cables are usually tensioned by a ratchet device until most of the resiliency or stretch of the cables has been taken up. Under these conditions, if the barges are subjected to separating forces such as might be occasioned by waves or obstructions encountered by the barges, the tension on the cables may temporarily reach a value sufficiently high to snap the cables. With a tension relief device such as that disclosed herein connected into such a cable, the shear pin will break before the associated cable breaks, thereby relieving the temporary excessive stress on the cable, and after the condition causing the excessive stress has terminated, the cable can be loosened for the insertion of a new shear pin in the tension relief device, after which the cable may be again tightened to its original condition.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A cable tension relief device comprising an elongated tubular body, a cable-attaching eye rotatably connected to one end of said body, a stem extending from the interior of said tubular body out of the other end of the latter, a head on the end of said stem within said tubular body, a cable-attaching eye on the other end of said stem, said head slidably fitting said tubular body and having a bore extending transversely therethrough and said tubular body having angularly spaced apart apertures therein adjacent said one end thereof and registrable with the ends of the bore in said head, a frangible pin extending through the apertures in said tubular body and the bore in said head and effective to maintain said head adjacent said one end of said tubular body until said pin is subjected to a predetermined shearing force, means providing a spring abutment interiorly of said tubular body at said other end of the latter, and a coil compression spring surrounding said stem between said head and said spring abutment.

2. A cable tension relief device comprising an elongated tubular body, a cable-attaching eye rotatably connected to one end of said body, a stem extending from the interior of said tubular body out of the other end of the latter, a head on the end of said stem within said tubular body, a cable-attaching eye on the other end of said stem, said head slidably fitting said tubular body and having a bore extending transversely therethrough and said tubular body having angularly spaced apart apertures therein adjacent said one end thereof, a tubular liner in the bore in said head, washer-shaped liners disposed one in each aperture in said body, the apertures in said washer-shaped liners being registrable with the end of the bore in said tubular liner, a frangible pin extending through the apertures in said washer-shaped liners and through the bore in said tubular liner and effective to maintain said head adjacent said one end of said tubular body until said pin is subjected to a predetermined shearing force, means providing a spring abutment interiorly of said tubular body at said other end of the latter, and a coil compression spring surrounding said stem between said head and said spring abutment.

3. A cable tension relief device comprising an elongated tubular body, a cable-attaching eye rotatably connected to one end of said body, a stem extending from the interior of said tubular body out of the other end of the latter, a head on the end of said stem within said tubular body, a cable-attaching eye on the other end of said stem, said head slidably fitting said tubular body and having a bore extending transversely therethrough and said tubular body having angularly spaced apart apertures therein adjacent said one end thereof and registrable with the ends of the bore in said head, a frangible pin extending through the apertures in said tubular body and the bore in said head and effective to maintain said head adjacent said one end of said tubular body until said pin is subjected to a predetermined shearing force, means providing a spring abutment interiorly of said tubular body at said other end of the latter, and a coil compression spring surrounding said stem between said head and said spring abutment, said means providing a spring abutment at said other end of said tubular body comprising an external annular flange on said tubular body at said other end thereof, a plate disposed against the outer side of said flange and having an aperture therethrough receiving said stem, and means detachably securing said plate to said flange.

RALPH A. GUFFEY.

References Cited in the file of this patent

UNITED STATES PATENTS

| Number | Name | Date |
|---|---|---|
| 2,128,030 | Koleno | Aug. 23, 1938 |
| 2,420,276 | Wood | May 6, 1947 |
| 2,510,815 | Granche | June 6, 1950 |